(12) United States Patent
Owen et al.

(10) Patent No.: US 7,725,770 B2
(45) Date of Patent: May 25, 2010

(54) ENHANCED FAILURE DATA COLLECTION SYSTEM APPARATUS AND METHOD

(75) Inventors: William W. Owen, Tucson, AZ (US); Joshua M. Rhoades, Tucson, AZ (US); Marina M. Ruíz, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 442 days.

(21) Appl. No.: 11/695,048

(22) Filed: Apr. 1, 2007

(65) Prior Publication Data

US 2008/0244333 A1 Oct. 2, 2008

(51) Int. Cl.
*G06F 11/00* (2006.01)
(52) U.S. Cl. ........................................................ 714/27
(58) Field of Classification Search .................... 714/27
See application file for complete search history.

(56) References Cited

U.S. PATENT DOCUMENTS

| | | | | |
|---|---|---|---|---|
| 5,978,870 | A * | 11/1999 | Warren | 710/71 |
| 6,260,160 | B1 * | 7/2001 | Beyda et al. | 714/27 |
| 6,430,164 | B1 * | 8/2002 | Jones et al. | 370/313 |
| 6,618,823 | B1 | 9/2003 | West | 714/25 |
| 6,751,569 | B2 * | 6/2004 | Merkin et al. | 702/120 |
| 6,823,476 | B2 | 11/2004 | Williams et al. | 714/25 |
| 7,028,221 | B2 | 4/2006 | Holland et al. | 714/31 |
| 7,051,230 | B2 | 5/2006 | Olson | 714/2 |
| 7,080,287 | B2 | 7/2006 | Salem | 714/38 |
| 7,210,063 | B2 * | 4/2007 | Holcroft et al. | 714/27 |
| 7,281,167 | B2 * | 10/2007 | Dube | 714/39 |
| 7,401,257 | B2 * | 7/2008 | Usui | 714/27 |
| 7,526,410 | B2 * | 4/2009 | Anastassopoulos et al. | 702/186 |
| 2003/0097469 | A1 | 5/2003 | Blair et al. | 709/239 |
| 2004/0044929 | A1 | 3/2004 | Chujo | 714/47 |
| 2005/0240826 | A1 | 10/2005 | Dickenson et al. | 714/42 |
| 2007/0016827 | A1 * | 1/2007 | Lopez et al. | 714/31 |
| 2008/0168309 | A1 * | 7/2008 | Dervisoglu et al. | 714/27 |

FOREIGN PATENT DOCUMENTS

EP 0586767 A1 3/1994

\* cited by examiner

*Primary Examiner*—Bryce P Bonzo
(74) *Attorney, Agent, or Firm*—Kunzler Needham Massey & Thorpe

(57) ABSTRACT

An apparatus for collecting failure data includes a failure data collector that initializes one or more test devices by establishing a secondary interface therewith in response to receiving a test device initialization command from a device tester, communicates one or more failure data collection requests to each test device corresponding to a failure data collection command received from the test device, and receives failure data from the test devices via the secondary interface in response to communicating the failure data collection request. In certain embodiments, the present invention includes a failure data storage repository for storing the collected failure data.

20 Claims, 4 Drawing Sheets

ENHANCED FAILURE DATA COLLECTION SYSTEM APPARATUS AND METHOD

BACKGROUND OF THE INVENTION

1. Field of the Invention

This invention relates to systems, apparatus, and methods for product testing and more particularly relates to systems, apparatus, and methods for collecting failure data.

2. Description of the Related Art

An important phase in the product development lifecycle is product testing. Through product testing, portions of a product that require correction and configuration can be identified. An important step in the product testing phase is failure data collection. Collecting failure data enables the analysis of a product's performance and the formation of additional product development strategies.

Though current failure data collection solutions collect failure data, there exist certain problems. For example, collecting failure data in a test system involving multiple devices often requires an individual to log into each device and collect the failure data logs there from. As the number of devices of a system increases, so does the time and resources required to collect failure data. The failure data collection process is further delayed as the failure data collected from each device often must be inputted or otherwise communicated to an additional device or system for analysis. As the time and resources required for failure data collection increases, the time and resource required to test and develop a product also increases.

SUMMARY OF THE INVENTION

The present invention has been developed in response to the present state of the art, and in particular, in response to the problems and needs in the art that have not yet been fully solved by currently available failure data collection solutions. Accordingly, the present invention has been developed to provide an apparatus, system, and method for enhanced failure data collection.

One problem common to current failure data collection solutions is that the interface used to test a device is also the interface used to collect failure data. At times there is a need to not disturb the test interface while collecting failure data. Also, some errors that occur during testing render the interface at least temporarily unusable. There is also a need to be able to retrieve device data quickly to ensure the appropriate data is gathered In one aspect of the present invention, an enhanced system for collecting failure data includes one or more test devices, one or more device testers capable of testing the test devices, a failure data collector, and a failure data repository. The failure data collector initializes the test devices by establishing a secondary interface therewith in response to receiving a test device initialization command from the device tester, communicates one or more failure data collection requests to each test device corresponding to a failure data collection command, and receives failure data from the test devices via the secondary interface in response to communicating the failure data collection request. In certain embodiments, the system also includes a failure data repository that stores failure data received from the test devices.

In one aspect of the present invention an apparatus for collecting failure data includes a test device initialization module configured to initialize test devices in response to receiving a test device initialization command from a device tester. Initializing test devices includes establishing one or more secondary interfaces with each test device for receiving failure data. The apparatus also includes a failure data request module that communicates failure data collection requests to the test devices corresponding to a failure data collection command and a failure data collection module that receives failure data from the test devices via one or more of the secondary interfaces in response to communicating the failure data collection request.

In certain embodiments, the test device initialization module also communicates an initialization complete message to the device tester upon initialization of the test devices. In certain embodiments, the test device initialization module access test device configuration data to facilitate communicating with the test devices. In some embodiments, the apparatus also includes a test device configuration data repository configured to store data that facilitates establishing the secondary interfaces with the test devices and communicating the failure data collection requests.

A method of the present invention is also presented for collecting failure data. The method in the disclosed embodiments substantially includes the operations necessary to carry out the functions presented above with respect to the described system and apparatus. In one embodiment, the method includes initializing one or more test devices by establishing a secondary interface therewith in response to receiving a test device initialization command, communicating one or more failure data collection requests to each test device corresponding to the failure data collection command, and receiving failure data from the test devices via the secondary interface in response to communicating the failure data collection request.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
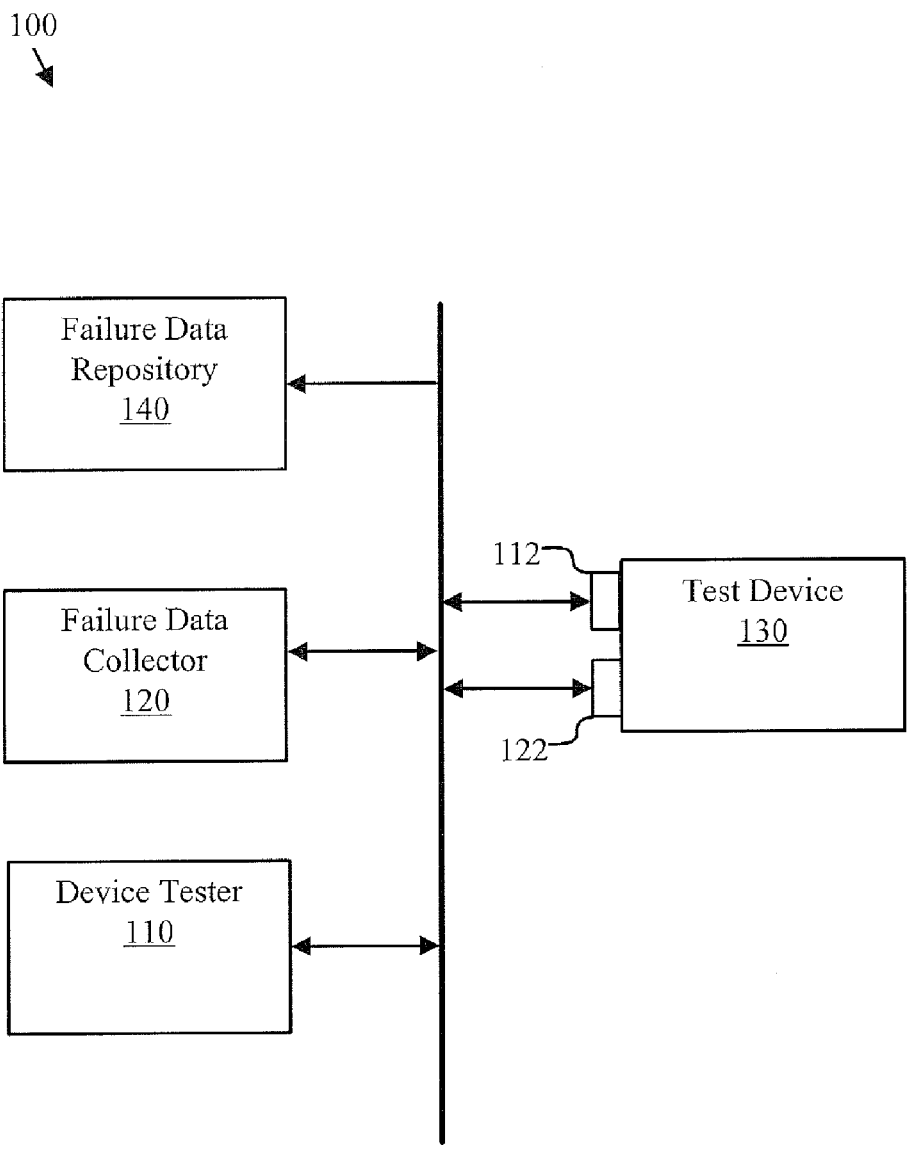
FIG. 1 is a perspective view of one embodiment of a failure data collection system in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, among different processors, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of generating a signal, causing a signal to be generated, or causing execution of a program of machine-readable instructions on a digital processing apparatus. A computer readable medium may be embodied by a transmission line, a compact disk, digital-video disk, a magnetic tape, a Bernoulli drive, a magnetic disk, holographic disk or tape, a punch card, flash memory, magnetoresistive memory, integrated circuits, or other digital processing apparatus memory device.

Furthermore, the described features, structures, or characteristics of the invention may be combined in any suitable manner in one or more embodiments. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a perspective view of one embodiment of a failure data collection system 100 in accordance with the present invention. The depicted system 100 includes a device tester 110, a failure data collector 120, a test device 130, and a failure data repository 140. The components of the system 100 enable failure data collection.

The device tester 110 communicates a test device initialization command corresponding to the test device 130 to the failure data collector 120. The failure data collector 120 initializes the test device 130 in response to receive the test device initialization command which includes establishing one or more secondary interfaces 122 with the test device 130 through which failure data may be received. Establishing a secondary interface 122 ensures that failure data will be recoverable from a testing phase even if a particular test renders the primary interface 112 dysfunctional. Additionally, establishing a secondary interface 122 enables failure data collection to occur quickly to ensure failure data is gathered before the failure data is lost. The secondary interface 122 also ensures that failure data may be collected without disturbing the primary interface 112.

In certain embodiments, the failure data collector 120 communicates an initialization complete message to the device tester 110 upon initialization of the test device 130. In some embodiments, the device tester 110 runs one or more tests on the test device 130 via a primary interface 112. The device tester 110 may communicate a failure data collection command to the failure data collector 120 at an appropriate time such as upon failure of a test operation.

The failure data collector 120 communicates a failure data collection request to the test device 130 and receives failure data there from. Depending upon the scenario and embodiment, the failure data collector 120 may receive the failure data via the primary interface 112 and/or the secondary interface 122. Accordingly, the system 110 provides a failure data collection solution that ensures the collection of failure data despite test operations that result in a dysfunctional primary interface 112.

Figure 2:
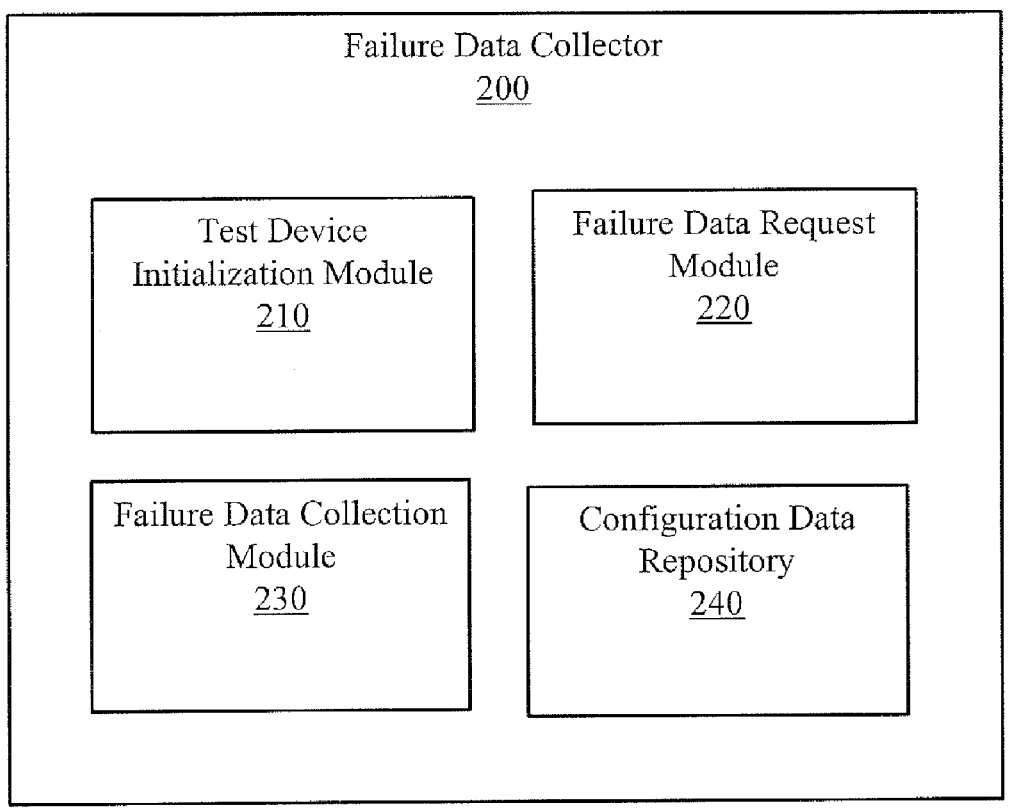
FIG. 2 is a perspective view of one embodiment of a failure data collector in accordance with the present invention.

FIG. 2 is a perspective view of one embodiment of a failure data collector 200 in accordance with the present invention. The depicted failure data collector 200 includes a test device initialization module 210, a failure data request module 220, a failure data collection module 230, and a test device configuration data repository 240. In certain embodiments, the failure data collector 200 corresponds to the failure data collector 120 of FIG. 1. The various modules of the failure data collector 200 operate harmoniously to enhance failure data collection.

The test device initialization module 210 initializes test devices in response to receiving a test device initialization command from a device tester 110. Initializing test devices includes establishing one or more secondary interfaces with the test device for receiving failure data. In some embodiments, the test device initialization module 210 records a time stamp for each of the test devices that facilitate associating failure data with a particular test. In certain embodiments, the initialization module 210 communicates a test device initialization complete message to the device tester 110 notifying the test device that the failure data collection system 100 is prepared to proceed with testing.

The failure data request module 220 communicates a failure data collection request to the test devices 130 in accordance with a failure data collection command received from the device tester 110. In certain embodiments, the failure data collection module 230 may receive failure data from the test devices 130 via the secondary interface 122 and communicate the failure data to a failure data repository where the failure data may be stored. In this manner, the failure data collector 200 provides a centralized solution for collecting failure data from multiple test devices and delivering the failure data to a destination where the failure data may be used to facilitate product testing and development.

In certain embodiments, the configuration data repository 240 includes test device configuration data that facilitates communicating with the test devices 130. More specifically, the test device configuration data may facilitate establishing a secondary interface 122 with a test device 130 and communicating failure data collection requests thereto. Examples of the test device 130 configuration data include an IP address, authentication mechanism, device name, device group, commands for accessing a test device, and commands for collecting failure data. One skilled in the art will recognize that the failure data collector 200 expedites and simplifies product testing by enabling a centralized communications crossroads between device testers 110 and test devices 130 of varying types.

Figure 3:
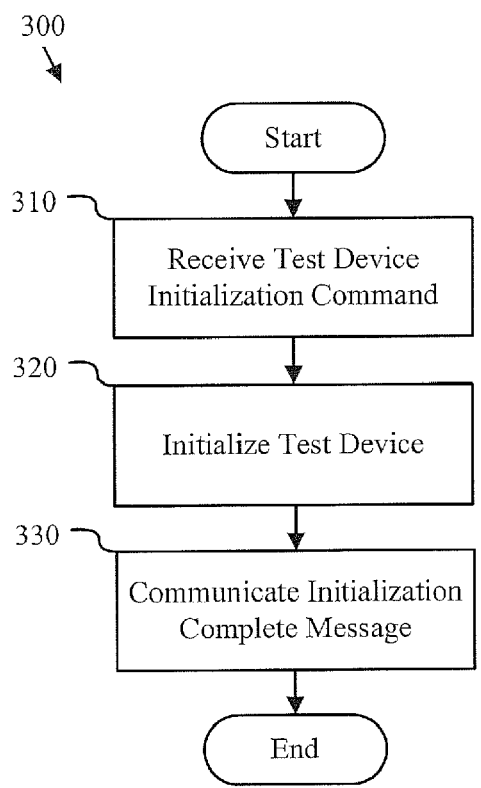
FIG. 3 is schematic block diagram of one embodiment of a test device initialization method in accordance with the present invention.

FIG. 3 is a schematic block diagram of one embodiment of a test device initialization method 300 in accordance with the present invention. The method 300 includes the operations of receiving 310 a test device initialization command, initializing 320 test devices, and communicating 330 an initialization complete message. The operations of the method 300 operate to initialize a test device.

Receiving 310 a test device initialization command may include a failure data collector 120 receiving a test device initialization command from a device tester 110. In certain embodiments, the test device initialization command may be a single command that requests the initialization of multiple test devices 130. Initializing 320 test devices may include establishing one or more secondary interfaces with one or more test devices in accordance with the initialization command. In some embodiments, initializing 320 test devices may include accessing a configuration data repository 240 and recording a timestamp for one or more of the test devices initialized.

Communicating 330 an initialization complete message may include a failure data collector 200 communicating an initialization complete message to a test device 110 from whence the test device initialization command originated. In some embodiments, the initialization complete message may include an initialization status (i.e. success or failure) of each test device specified in the test device initialization command previously received. In some embodiments, the device tester 110 begins testing the test devices 130 upon reception of the initialization complete message.

Figure 4:
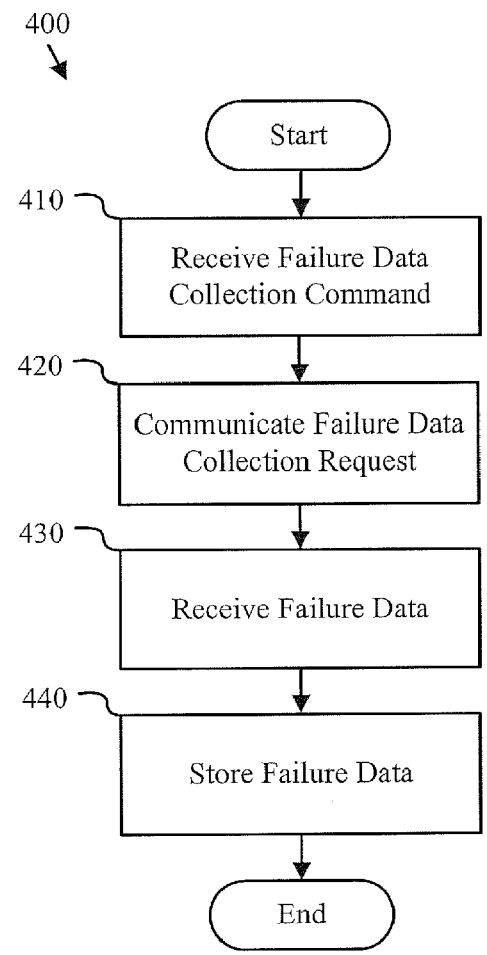
FIG. 4 is a schematic block diagram of one embodiment of a failure data collection method in accordance with the present invention.

FIG. 4 is a schematic block diagram illustrating one embodiment of a failure data collection method 400 in accordance with the present invention. The depicted method 400 includes the operations of receiving 340 a failure data collection command, communicating 350 a failure data collection request, receiving 360 failure data, and storing 370 failure data. The operations of the method 300 operate to collect failure data.

Receiving 410 a failure data collection command may include a failure data collector 120 receiving a failure data collection command from a test device 110. In some embodiments, a single failure data collection command may include a command to collect data from multiple test devices 130.

Communicating 420 failure data collection requests may include a failure data collector 120 communicating a failure data collection request to multiple test devices. In some embodiments, communicating 420 failure data requests includes communicating multiple requests to the same test device to ensure complete collection of all relevant failure data. In some embodiments, communicating 420 failure data collection requests includes accessing test device configuration data which may include commands or protocol for communicating 420 a failure data request to a particular test device 130.

Receiving 430 failure data may include a failure data collector 110 receiving failure data from one or more test devices 130 via a secondary interface. In some embodiments, the secondary interface may be the only channel for receiving 430 failure data. In other embodiments, failure data may be received via both a primary interface and a secondary interface. In yet other embodiments, failure data is received via the secondary interface when the primary interface 112 is dysfunctional.

Storing 440 failure data may include storing failure data received by the failure data collector 120 from one or more test devices 130. Storing 440 failure data may include transferring the failure data collected by the failure data collector 120 to a local or remote failure data repository. Accordingly, the operations of the method 400 describe one embodiment for collecting failure data of the present invention.

Figure 5:
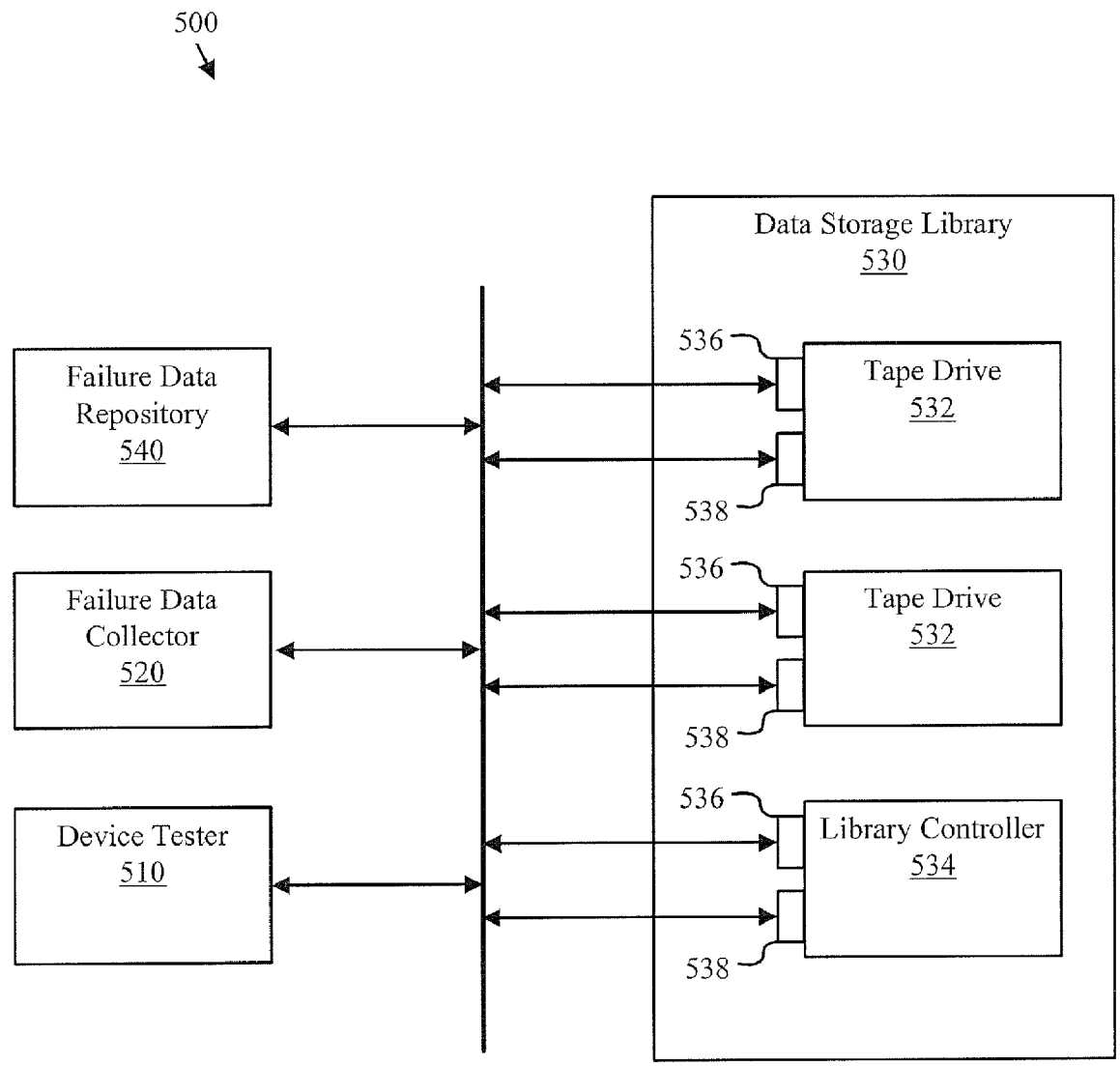
FIG. 5 is a perspective view of one embodiment of a failure data collection system in accordance with the present invention.

FIG. 5 is a perspective view of one embodiment of a failure data collection system 500 in accordance with the present invention. The system 500 includes a device tester 510, a failure data collector 520, a failure data repository 540, and a data storage library 530 with a library controller 534 and two tape drives 532. In certain embodiments, the system 500 corresponds to one example of the system 100 of FIG. 1. The components of the system 500 cooperate to collect failure data.

The device tester 510 communicates a test device initialization command corresponding to the tape drives 532 and library controller 534 to the failure data collector 520. Upon reception of the test device initialization command, the failure data collector 520 initializes the tape drives 532 and library controller 534 which includes establishing a secondary interface 538 with each tape drive 532 and library controller 534. In some embodiments, the failure data collector 520 timestamps the initialization of each tape drive 532 and library controller 534 to facilitate associating a batch of failure data with a particular test.

In certain embodiments, the failure data collector 520 includes test device configuration data that facilitates initializing the tape drives 532 and library controller 534 such as a host name, IP address, protocol information, authentication information, and more. Having test device configuration data accessible to the failure data collector 520 enables a user to swap one device tester 510 for another, without having to ensure that the new device tester includes the necessary test device configuration data. Upon initialization, the failure data collector 520 communicates an initialization complete message to the device tester 510 that indicates to the device tester 510 the failure data collection system 500 is ready for testing.

The device tester 510 may then commence testing the tape drives 532 and library controller 534 according to whatever test may be desirable for a given product testing phase. In some embodiments, the device tester 510 communicates with the tape drives 532 and library controller 534 via an already established primary interface 536. In some embodiments, when a particular test results in one or more failure messages, the device tester 510 communicates a failure data collection command to the failure data collector 520. Upon reception of the failure data collection command, the failure data collector 520 communicates a failure data collection request in accordance with the failure data collection command.

In response to communicating the failure data collection request, the failure data collector 520 may receive failure data from the tape drives 532 and library controller 534. In some embodiments, the failure data collector 520 may communicate additional failure data collection requests to ensure reception of all relevant failure data.

In certain embodiments, the failure data collector 520 access test device configuration data such as device specific commands to facilitate communicating a proper failure data collection request. Having such configuration data accessible by the failure data collector 520 enables a user to interchange device testers without having to ensure that new device testers include the configuration data necessary to collect failure data. Rather, the device tester needs only to be able to communicate a failure data collection command to the failure data collector.

Depending upon the embodiment, the failure data may be received via the primary interface and/or the secondary interface. Having a secondary interface 538 ensures that, should the primary interface 236 fail, there will be an additional interface through which the failure data may be collected. Certain embodiments may include multiple secondary interfaces 538 for redundancy. Failure data collected by the failure data collector 520 may be communicated to the failure data repository 540 for storage. In certain embodiments, the failure data repository 540 may operate as a repository of failure data for multiple data collection systems 540.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for collecting failure data, the apparatus comprising a storage device, a processor, and a plurality of software modules stored on the storage device and configured to execute on the processor including:
   a test device initialization module configured to initialize a test device in response to receiving a test device initialization command from a device tester configured to test the test device via a primary interface, wherein initializing the test device comprises establishing a secondary interface with the test device for receiving failure data;
   a failure data request module configured to communicate a failure data collection request to the test device in response to receiving a failure data collection command from the device tester; and
   a failure data collection module configured to receive failure data from the test device via the secondary interface in response to communicating the failure data collection request.

2. The apparatus of claim 1, wherein the test device initialization module is further configured to communicate an initialization complete message to the device tester upon initialization of the test device.

3. The apparatus of claim 1, wherein the failure data collection module is further configured to communicate failure data received from the test device to a failure data repository for storage.

4. The apparatus of claim 1, wherein the failure data collection module is configured to communicate additional failure data collection requests to the test device to ensure complete collection of failure data.

5. The apparatus of claim 1, wherein the test device initialization module is further configured to record a timestamp for the test device.

6. The apparatus of claim 1, further comprising a test device communication data repository configured to store data to facilitate establishing the secondary interface with the test device and communicating the failure data collection request.

7. The apparatus of claim 6, wherein the communication data is selected from the group consisting of a host name, IP address, port number, authentication mechanism, device type, device name, device group, commands for accessing the test device, commands for collecting failure data, and commands for initializing communication with the test device.

8. The apparatus of claim 1, wherein the test device is selected from the group consisting of a data storage drive, a data storage library, a data storage subsystem, a computer, a computing device, a computing system, a networking device, and a computer network.

9. An apparatus comprising a storage device with a plurality of software modules stored thereon, the plurality of software modules configured to enable a digital processing apparatus to perform operations for collecting failure data, the operations comprising:
   initializing a test device in response to receiving a test device initialization command from a device tester configured to test the test device via a primary interface, wherein initializing the test device comprises establishing a secondary interface with the test device for receiving failure data;
   communicating a failure data collection request to the test device in response to receiving the failure data collection command from the test device; and
   receiving failure data from test device via the secondary interface in response to communicating the failure data collection request.

10. The apparatus of claim 9, further comprising communicating an initialization complete message to the device tester upon initialization of the test device.

11. The apparatus of claim 9, further comprising storing the failure data received from the test device in a failure data repository.

12. The apparatus of claim 9, further comprising communicating additional failure data collection requests to the test device to ensure complete collection of failure data.

13. The apparatus of claim 9, wherein initializing the test device further comprises recording a timestamp for the test device.

14. The apparatus of claim 9, further comprising accessing test device communication data configured to facilitate establishing the secondary interface with the test device and collecting failure data there from.

15. The apparatus of claim 14, wherein the communication data is selected from the group consisting of a host name, IP address, port number, authentication mechanism, device type, device name, device group, commands for accessing the test device, commands for collecting failure data, and commands for initializing communication with the test device.

16. The apparatus of claim 9, wherein the test device is selected from the group consisting of a data storage drive, a data storage library, a data storage subsystem, a computer, a computing device, a computing system, a networking device, and a computer network.

17. A system for collecting failure data, the system comprising:
- a test device comprising a primary interface and a secondary interface;
- a device tester configured to test the test device via the primary interface;
- a failure data collector comprising a processor and a plurality of software modules configured to:
  - initialize the test device in response to receiving a test device initialization command from the device tester, wherein initializing the test device comprises establishing the secondary interface with the test device for receiving failure data;
  - communicate a failure data collection request to the test device corresponding to a failure data collection command received from the test device; and
  - receive failure data from the test device via the secondary interface in response to communicating the failure data collection request.

18. The system of claim 17, further comprising a failure data repository configured to store failure data received from the test device.

19. The system of claim 17, wherein the test device is selected from the group consisting of a data storage drive, a data storage library, a data storage subsystem, a computer, a computing device, a computing system, a networking device, and a computer network.

20. A method for collecting failure data, the method comprising:
- receiving a test device initialization command from a device tester configured to test the test device via a primary interface;
- initializing a test device in accordance with the test device initialization command, wherein initializing the test device comprises establishing a secondary interface with the test device for communicating failure data;
- communicating an initialization complete message to the device tester;
- receiving a failure data collection command from the device tester;
- communicating failure data collection request to test device corresponding to the failure data collection command; and
- receiving failure data from the test device via the secondary interface in response to communicating the failure data collection request.

* * * * *